United States Patent
Borgerson

(10) Patent No.: US 7,311,630 B2
(45) Date of Patent: Dec. 25, 2007

(54) MULTI-SPEED TRANSMISSION WITH DIFFERENTIAL GEAR SET AND COUNTERSHAFT GEARING

(75) Inventor: James B. Borgerson, Ann Arbor, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 176 days.

(21) Appl. No.: 11/302,959

(22) Filed: Dec. 14, 2005

(65) Prior Publication Data

US 2007/0131046 A1 Jun. 14, 2007

(51) Int. Cl.
*F16H 37/08* (2006.01)
*F16H 37/02* (2006.01)
*F16H 3/44* (2006.01)

(52) U.S. Cl. ............... 475/215; 475/218; 475/201; 475/302; 475/303

(58) Field of Classification Search ............... 475/215, 475/218, 200, 201, 302, 303; 74/330, 331
See application file for complete search history.

(56) References Cited

U.S. PATENT DOCUMENTS

| | | | | |
|---|---|---|---|---|
| 2,112,487 A | * | 3/1938 | Freeborn | 475/257 |
| 2,466,320 A | * | 4/1949 | Lawrence | 475/140 |
| 2,529,423 A | * | 11/1950 | Schou | 475/118 |
| 3,285,100 A | * | 11/1966 | Peltner et al. | 475/52 |
| 3,548,680 A | * | 12/1970 | Crooks | 475/296 |
| 5,013,289 A | * | 5/1991 | Van Maanen | 475/286 |
| 6,387,006 B1 | | 5/2002 | Jung | 475/207 |
| 6,869,379 B2 | | 3/2005 | Voss et al. | 475/218 |
| 7,163,483 B2 | * | 1/2007 | Haka | 475/212 |

FOREIGN PATENT DOCUMENTS

WO  WO 99/15810  4/1999

* cited by examiner

*Primary Examiner*—Tisha Lewis

(57) ABSTRACT

A transmission is provided having a differential gear set with three input torque-transmitting mechanisms, such as friction clutches, to achieve torque flow through the differential gear set to a countershaft gearing arrangement. The transmission utilizes power-on shifts. By utilizing the torque ratio of the differential gear set, additional forward ratios are available with good step progression, reducing the number of countershaft gear sets and synchronizers necessary in comparison to a dual-clutch transmission providing the same number of ratios. A shorter axial length is thus attainable.

15 Claims, 4 Drawing Sheets

| GEAR | 90 | 91 | 92 | 93 | 94 | 95 | 96 | 97 | 98 |
|------|----|----|----|----|----|----|----|----|----|
| REV  | X  |    |    |    |    |    |    |    | X  |
| 1    | X  |    |    | X  | O  |    |    |    |    |
| 1'   |    | X  |    | X  | X  |    |    |    |    |
| 2    |    |    | X  |    | X  | O  |    |    |    |
| 3    |    | X  |    |    | X  | X  |    |    |    |
| 4    | X  |    |    |    |    | X  | O  |    |    |
| 4'   |    | X  |    |    |    | X  | X  |    |    |
| 5    |    |    | X  |    |    |    | X  | O  |    |
| 6    |    | X  |    |    |    |    | X  | X  |    |
| 7    | X  |    |    |    |    |    |    | X  |    |

X = ENGAGED   O = OPEN

| GEAR | RATIO | STEP |
|---|---|---|
| 1 | 4.09 | |
| 1' | 3.52 | 1.16 |
| 2 | 2.47 | 1.65(1.43) |
| 3 | 1.72 | 1.44 |
| 4 | 1.31 | 1.31 |
| 4' | 1.20 | 1.09 |
| 5 | 1.00 | 1.31(1.20) |
| 6 | 0.76 | 1.31 |
| 7 | 0.64 | 1.20 |
| REV | -3.53 | -0.86 |
| OVERALL RATIO | | 6.40 |

| GEAR | 290 | 291 | 292 | 293 | 294 | 295 | 296 | 297 | 298 |
|------|-----|-----|-----|-----|-----|-----|-----|-----|-----|
| REV  |     |     | X   | X   |     |     |     |     | X   |
| 1    | X   |     |     | X   | O   |     |     |     |     |
| 1'   |     | X   |     | X   | X   |     |     |     |     |
| 2    |     |     | X   |     | X   | O   |     |     |     |
| 3    |     | X   |     |     | X   | X   |     |     |     |
| 4    | X   |     |     |     |     | X   | O   |     |     |
| 4'   |     | X   |     |     |     | X   | X   |     |     |
| 5    |     |     | X   |     |     |     | X   | O   |     |
| 6    |     | X   |     |     |     |     | X   | X   |     |
| 7    | X   |     |     |     |     |     |     | X   |     |

X = ENGAGED   O = OPEN

| GEAR | RATIO | STEP |
|---|---|---|
| 1 | 2.97 | |
| 1' | 2.51 | 1.18 |
| 2 | 1.97 | 1.51(1.27) |
| 3 | 1.45 | 1.36 |
| 4 | 1.00 | 1.45 |
| 4' | 0.87 | 1.14 |
| 5 | 0.73 | 1.38(1.20) |
| 6 | 0.59 | 1.24 |
| 7 | 0.49 | 1.26 |
| REV | -3.46 | -1.16 |
| OVERALL RATIO | | 6.40 |

MULTI-SPEED TRANSMISSION WITH DIFFERENTIAL GEAR SET AND COUNTERSHAFT GEARING

TECHNICAL FIELD

The invention relates to a multi-speed transmission having both a differential gear set and a countershaft gearing arrangement.

BACKGROUND OF THE INVENTION

A typical multi-speed, dual clutch transmission uses a combination of two friction clutches and several dog clutch/synchronizers to achieve "power-on" or dynamic shifts by alternating between one friction clutch and the other, with the synchronizers being "pre-selected" for the oncoming ratio prior to actually making the dynamic shift. "Power-on" shifting means that torque flow from the engine need not be interrupted prior to making the shift. This concept typically uses countershaft gears with a different, dedicated gear pair or set to achieve each forward speed ratio (with the exception of being able to achieve a direct drive ratio in a rear wheel drive application). Accordingly, the total number of gears required in this typical design is two times the number of forward speeds, plus three for reverse. This necessitates a large number of required gear pairs, especially in transmissions that have a relatively large number of forward speed ratios.

SUMMARY OF THE INVENTION

A transmission is provided having a differential gear set with three input torque-transmitting mechanisms, such as friction clutches, to achieve torque flow through the differential gear set to a countershaft gearing arrangement utilizing power-on shifts. In comparison with a convention dual-clutch transmission, one of the input torque-transmitting mechanisms and the differential gear set are added. By utilizing the torque ratio of the differential gear set, additional torque ratios are available with good step progression, reducing the number of countershaft gear sets and synchronizers necessary in comparison to a dual-clutch transmission providing the same number of torque ratios. A shorter axial length is thus attainable.

Specifically, a transmission is provided including an input member and an output member. A differential gear set has first, second and third members and a first, a second and a third torque-transmitting mechanism are each selectively engagable to connect the input member with a respective different one of the differential gear set members. A countershaft gearing arrangement is operatively connected to the differential gear set. The countershaft gearing arrangement includes a plurality of sets of co-planar intermeshing gears, a plurality of shafts axially and a plurality of synchronizers selectively engagable to transfer torque from the differential gear set to the output member along the shafts and the sets of co-planar, intermeshing gears.

By providing three torque-transmitting mechanisms, additional torque ratios are achieved with respect to the dual-clutch transmission. Specifically, the first torque-transmitting mechanism is selectively engagable along with a first of the synchronizers to establish a first torque ratio between the input member and the output member. The second torque-transmitting mechanism is selectively engagable along with a second of the synchronizers to establish a second torque ratio between the input member and the output member. The third torque-transmitting mechanism is selectively engagable along with both of the first and second synchronizers to establish the third torque ratio between the input member and the output member. The numerical value of the third torque ratio is less than the first torque ratio and greater than the second torque ratio. The third torque ratio is a combined ratio determined by the torque ratio of the differential gear set as well as the torque ratios of the active sets of co-planar, intermeshing gears. The first and second torque ratios, however, are determined based only on the torque ratios of the active sets of co-planar, intermeshing gears. Thus, the sets of co-planar, intermeshing gears through which torque is carried during engagement of the first or the second torque-transmitting mechanism are reused when the third torque-transmitting mechanism is engaged to provide the different, third torque ratio. In other words, the torque ratio of the differential gear set does not affect the first and second ratios, but allows a torque ratio between the first and second torque ratios (i.e., the third torque ratio).

Within the scope of the invention, the differential gear set may be a beveled gear set, a simple pinion or a double pinion planetary gear set.

The countershaft gearing arrangement may be a two-axis design, having only one countershaft, or a three-axis design, having two offset countershafts.

In another aspect of the invention, a reverse torque ratio may be achieved utilizing a dedicated set of co-planar, intermeshing gears. However, in another embodiment, a reverse torque ratio is achieved by adding a synchronizer that selectively connects one of the members of the differential gear set to a stationary member to obtain a reverse torque ratio, thus eliminating the need for a dedicated set of intermeshing gears. Preferably, in the latter embodiment, the differential gear set is a double pinion planetary gear set and the additional synchronizer grounds the ring gear member to a stationary member such as the transmission housing.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figures 1, 2:
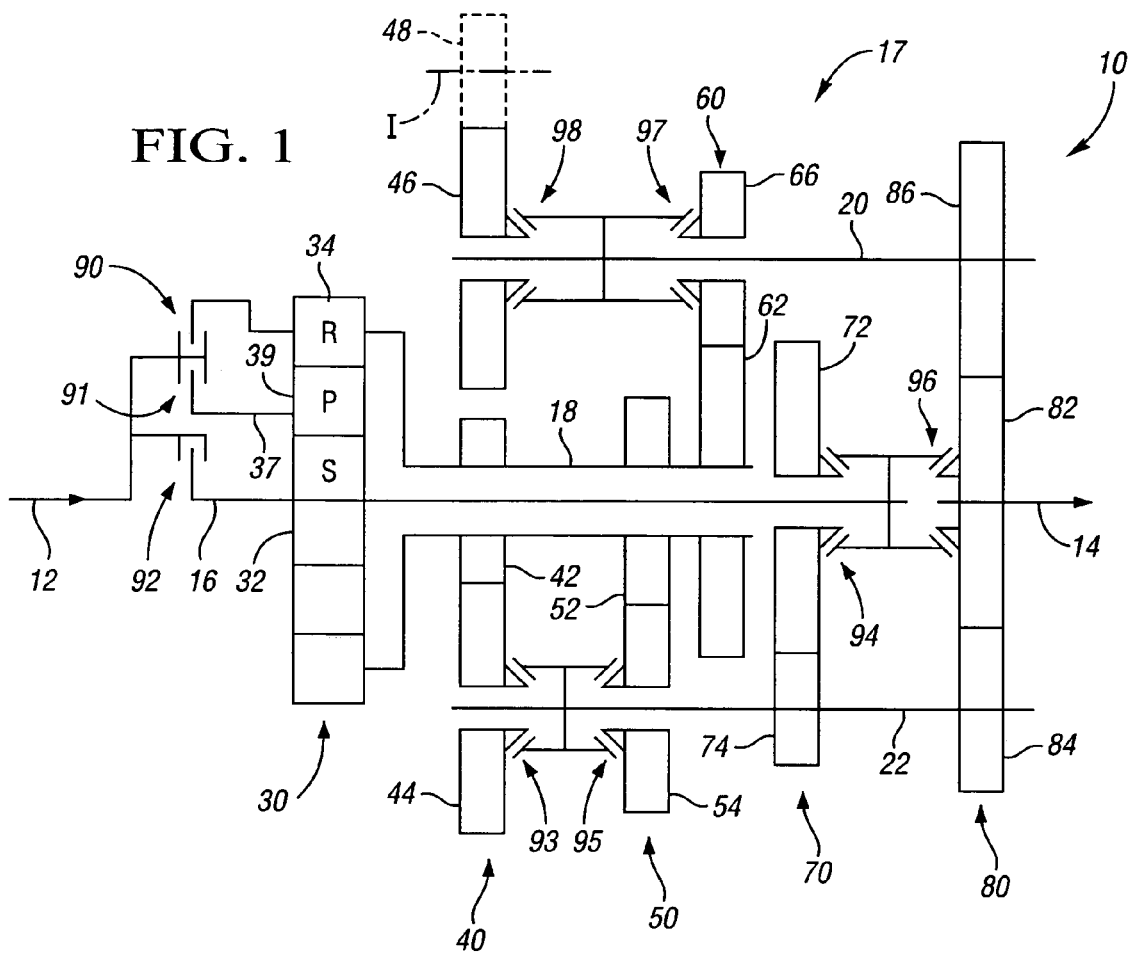
FIG. 1 is a schematic representation of a first embodiment of a transmission in accordance with the invention.
FIG. 2 is a truth table listing the engaged torque-transmitting mechanisms and synchronizers for selected torque ratios achieved by the transmission of FIG. 1.

Referring to the drawings, wherein like reference numbers refer to like components, in FIG. 1 a multi-speed transmission 10 is depicted. The transmission 10 includes an input member 12 and output member 14. In this embodiment, the input member 12 and the output member 14 are shafts, and will be referred to as such. Those skilled in the art will appreciate that the input and output members 12, 14 may be components other than shafts. The input shaft 12 is continuously connected with an engine (not shown). The output shaft 14 is continuously connected with the final drive unit (not shown). The transmission 10 includes a countershaft gearing arrangement 17 that includes intermediate shafts, countershafts, co-planar intermeshing gear sets and selectively engagable synchronizers as will be described herein. For instance, the countershaft gearing arrangement 17 includes an intermediate shaft 16 and an intermediate shaft 18, which is a sleeve shaft concentric with the intermediate shaft 16. The intermediate shafts 18 and 16 are referred to in the claims as the first and second intermediate shafts, respectively. The countershaft gearing arrangement 17 further includes a countershaft 20 and a countershaft 22. Countershaft 20 is referred to in the claims as the second countershaft and countershaft 22 is referred to in the claims as the first countershaft. The countershafts 20, 22 are both spaced from and parallel with the input shaft 12, the output shaft 14 and the intermediate shafts 16, 18.

A differential gear set 30, which is a simple planetary gear set, is connected between the input shaft 12 and the output shaft 14. The differential gear set 30 includes sun gear member 32 (labeled S) connected for common rotation with the intermediate shaft 16, a ring gear member 34 (labeled R) connected for common rotation with the intermediate shaft 18, and a carrier member 37 which rotatably supports a set of pinion gears 39 (labeled P) which intermesh with both the sun gear member 32 and the ring gear member 34.

The countershaft gearing arrangement 17 also includes co-planar, intermeshing gear sets 40, 50, 60, 70 and 80. Gear set 40 includes gears 42, 44, 46 and 48. Gear 42 is connected for common rotation with the intermediate shaft 18 and intermeshes with gear 44, which is rotatable about and selectively connectable with the countershaft 22. Gear 46 is rotatable about and selectively connectable with the countershaft 20. An idler gear 48 rotates about idler axis I and intermeshes with both the gear 42 and gear 46. (Gear 48 is shown intermeshing only with gear 46 but those skilled in the art will readily understand that gear 48 is actually placed adjacent and between gears 42 and 46 to allow torque transfer therebetween).

Co-planar gear set 50 includes gear 52 and gear 54. Gear 52 is connected for common rotation with intermediate shaft 18 and intermeshes with gear 54, which rotates about and is selectively connectable with countershaft 22.

Gear set 60 includes co-planar intermeshing gears 62 and 66. Gear 62 is connected for common rotation with the intermediate shaft 18 and intermeshes with gear 66, which is rotatable about and selectively connectable with countershaft 20.

Gear set 70 includes co-planar, intermeshing gears 72 and 74. Gear 72 rotates about and is selectively connectable with intermediate shaft 16. Gear 72 intermeshes with gear 74, which is connected for common rotation with countershaft 22.

Gear set 80 includes gear 82, gear 84 and gear 86. Gear 82 is connected for common rotation with the output shaft 14 and is selectively connectable with the intermediate shaft 16. Gear 82 intermeshes with both gear 84 and gear 86. Gear 84 is connected for common rotation with the countershaft 22. Gear 86 is connected for common rotation with the countershaft 20.

The transmission 10 includes a variety of torque-transmitting mechanisms or devices including input clutch 90, input clutch 91, and input clutch 92. In the claims, input clutch 90 is referred to as the first torque-transmitting mechanism, input clutch 92 is referred to as the second torque-transmitting mechanism and input clutch 91 is referred to as the third torque-transmitting mechanism. Input clutch 90 is selectively engagable to connect the input shaft 12 with the ring gear member 34. Input clutch 91 is selectively engagable to connect the input shaft 12 with the carrier member 37. Input clutch 92 is selectively engagable to connect the input shaft 12 with the sun gear member 32 and the intermediate shaft 16. The transmission 10 further includes a plurality of selectively engagable synchronizers 93, 94, 95, 96, 97, and 98. Synchronizer 93 is selectively engagable to connect gear 44 with countershaft 22 for common rotation therewith. Synchronizer 94 is selectively engagable to connect gear 72 with intermediate shaft 16 for common rotation therewith. Synchronizer 93 is referred to in the claims as the first synchronizer. Synchronizer 94 is referred to in the claims as the second synchronizer. Synchronizer 95 is selectively engagable to connect gear 54 with countershaft 22 for common rotation therewith. Synchronizer 96 is selectively engagable to connect the gear 82, and therefore the output shaft 14, with the intermediate shaft 16 for common rotation therewith. Synchronizer 97 is selectively engagable to connect gear 66 with countershaft 20 for common rotation therewith. Synchronizer 98 is selectively engagable to connect gear 46 with countershaft 20 for common rotation therewith.

The transmission 10 is capable of transmitting torque from the input shaft 12 to the output shaft 14 in at least seven forward torque ratios and one reverse torque ratio as indicated in the truth table of FIG. 2. Up to four additional forward torque ratios (two of which are indicated in FIG. 2) may be achieved for a total of eleven forward torque ratios, as will be described below. Each of the forward torque ratios and the reverse torque ratio is attained by engagement of one of the first, second, third torque-transmitting mechanism or input clutches 90, 91, 92 and one or more of the synchronizers 93-98. Those skilled in the art will readily understand that a different speed ratio is associated with each torque ratio. Thus, eleven forward speed ratios may be attained by the transmission 10.

To establish the reverse torque ratio (Gear REV), the input clutches and synchronizers are selected as set forth in the table of FIG. 2. The input clutch 90 and synchronizer 98 are engaged. The input clutch 90 connects the ring gear member 34 with the input shaft 12. Synchronizer 98 connects gear 46 for common rotation with countershaft 20. Torque is thus transferred from the input shaft 12 through the ring gear member 34 from gear 42 and intermediate shaft 18 to gear 46 and countershaft 20 through idler gear 48. Torque is then transferred from gear 86 to gear 82 and thereby to the output shaft 14.

Two additional reverse torque ratios not indicated in the truth table of FIG. 2 are optionally available. The first optional reverse torque ratio is achieved by a combination of engagement synchronizers listed for the reverse torque ratio listed as Gear REV and the forward torque ratio listed as Gear 2 in FIG. 2 (i.e., synchronizers 94 and 98), as well as the input clutch 91. In this arrangement, torque flows through carrier member 37, pinion gears 39 and ring gear member 34 to intermediate shaft 18. The torque is then transferred through reverse gear set 40 to countershaft 20, due to engagement of synchronizer 98, and then to output shaft 14 through gear set 80. Torque also flows through carrier member 37, pinion gears 39 and sun gear member 32 to intermediate shaft 16, through gear set 70 due to engagement of synchronizer 94, and then from countershaft 22 to output shaft 14 through gear set 80.

The second optional reverse torque ratio is achieved by a combination engagement of the synchronizers listed in FIG. 2 for the reverse torque ratio listed as Gear REV and the forward torque ratio listed in FIG. 2 as Gear 5 (i.e., synchronizers 96 and 98), as well as input clutch 91. In this arrangement, torque flows through carrier member 37, pinion gears 39 and ring gear member 34 to intermediate shaft 18. The torque is then transferred through reverse gear set 40 to countershaft 20, due to engagement of synchronizer 98, and then to output shaft 14 through gear set 80. Torque also flows through carrier member 37, pinion gears 39 and sun gear member 32 to intermediate shaft 16 directly to output shaft 14 via engagement of synchronizer 96.

A first forward torque ratio (listed as Gear 1 in the truth table of FIG. 2), is achieved by engaging the input clutch 90 and synchronizer 93. In this arrangement, torque is transferred from the input shaft 12 through the ring gear member 34 to the intermediate shaft 18 by engagement of the input clutch 90 and through gear set 40 to the countershaft 22 by engagement of synchronizer 93. Torque is then transferred to the output shaft 14 through the gear set 80.

A second optional forward torque ratio (indicated as Gear 1' in FIG. 2), may be obtained by engagement of input clutch 91 and synchronizers 93 and 94. Accordingly, to shift from Gear 1 to Gear 1', input clutch 90 is disengaged, input clutch 91 is engaged and synchronizer 94 is engaged while synchronizer 93 remains engaged. Thus, in the optional forward torque ratio 1', torque flows from the input shaft 12 through the carrier member 37 of differential gear set 30 by engagement of input clutch 91 and thereby through the sun gear 32 and the ring gear 34 to the intermediate shaft 16 and the intermediate shaft 18, respectively. The torque along intermediate shaft 16 is transferred through gear set 70 to countershaft 22 by engagement of synchronizer 94 and through the gear set 80 to output shaft 14. The torque on intermediate shaft 18 is transferred to countershaft 22 through gear set 40 by engagement of synchronizer 93. Torque is then transferred through gear set 80 to output shaft 14. As noted in FIG. 2, in the torque ratio for Gear 1, synchronizer 94 is open, i.e., is not transmitting torque. Accordingly, synchronizer 94 may be pre-selected to the necessary position of the on-coming torque ratio for Gear 1' (or Gear 2) prior to actually shifting the torque path via the input clutches 90, 91, 92, as indicated in FIG. 2.

A subsequent forward torque ratio, indicated as Gear 2 in FIG. 2, is established by engagement of input clutch 92 and synchronizer 94. Gear 2 may be achieved directly from Gear 1 or from Gear 1' if Gear 1' is selected after Gear 1. Either instance may be achieved without mechanical tie-up of the transmission 10. In Gear 2, torque is transferred from the input shaft 12 to the intermediate shaft 16 via the engaged input clutch 92. Torque is transferred along gear set 70, countershaft 22 and gear set 80 to output shaft 14 due to engagement of synchronizer 94.

The subsequent torque ratio, indicated as Gear 3 in the truth table of FIG. 2, is established by the engagement of the input clutch 91, synchronizer 94 and synchronizer 95. Thus, in shifting from Gear 2 to Gear 3, input clutch 92 is released and input clutch 91 is engaged. Synchronizer 94 remains engaged and synchronizer 95, which was open in Gear 2, is engaged in Gear 3. The input clutch 91 directs torque through carrier member 37 of the differential gear set 30 and pinion gears 39 to both the intermediate shaft 16 and 18 via the sun gear member 32 and ring gear member 34, respectively. The torque carried along intermediate shaft 16 is transferred to countershaft 22 through gear set 70 and then to output shaft 14 through gear set 80 due to engagement of synchronizer 94. Torque carrier along intermediate shaft 18 is transferred to countershaft 22 through gear set 50 due to engagement of synchronizer 95 and to output shaft 14 though gear set 80.

The next subsequent forward torque ratio, indicated as Gear 4 in the truth table of FIG. 2, is established with the engagement of the input clutch 90 and synchronizer 95. Thus, in shifting from Gear 3 to Gear 4, input clutch 91 and synchronizer 94 is released while input clutch 90 is engaged and synchronizer 95 remains engaged. Torque is transferred from the input shaft 12 to intermediate shaft 18 through ring gear 34 due to engaged input clutch 90. Torque is then transferred through gear set 50 to countershaft 22 due to engagement of synchronizer 95. Torque is transferred through gear set 80 to output shaft 14.

The next subsequent torque ratio may optionally be achieved in Gear 4', or alternatively, a shift may be made from Gear 4 directly to Gear 5. Assuming a shift is made from Gear 4 to Gear 4', input clutch 91 is engaged along with synchronizers 95 and 96. Thus, in shifting from Gear 4 to Gear 4', input clutch 90 is released while input clutch 91 is engaged, synchronizer 95 remains engaged and synchronizer 96 is engaged. Torque is transferred from input shaft 12 through the differential gear set 30 via engagement of input clutch 91 and to the intermediate shafts 16 and 18. The torque carried on intermediate shaft 16 is transferred to the output shaft 14 due to engagement of synchronizer 96, which operatively connects the output shaft 14 and gear 82 to intermediate shaft 16. The torque carried on intermediate shaft 18 is transferred through gear set 50 to countershaft 22 and through gear set 80 to the output shaft 14 due to the engagement of synchronizer 95.

A subsequent forward torque ratio indicated as Gear 5 in FIG. 2, is established with the engagement of input clutch 92 and synchronizer 96. If Gear 5 is achieved in a shift from Gear 4', input clutch 91 is released while input clutch 92 is engaged, with synchronizer 96 remaining engaged. Alternatively, if Gear 5 is achieved in a shift from Gear 4, input clutch 90 is released while input clutch 92 is engaged and synchronizer 95 is released while synchronizer 96 is engaged. Torque is transferred from the input shaft 12 along the intermediate shaft 16 directly to the output shaft 14 due to engagement of the input clutch 92 and synchronizer 96. Thus, a direct drive ratio is achieved, with the speed and torque of the output shaft 14 and the speed and torque of the input shaft 12 being equal.

A subsequent forward torque ratio indicated as Gear 6 in the truth table of FIG. 2 is established with the engagement of input clutch 91 and synchronizers 96 and 97. Thus, in shifting from Gear 5 to Gear 6, input clutch 92 is released while input clutch 91 is engaged with synchronizer 96 remaining engaged and synchronizer 97 being engaged. Torque is transferred from the input shaft 12 through the differential gear set 30 by engagement of the input clutch 91 to both the intermediate shafts 16 and 18 through the sun gear member 32 and the ring gear member 34, respectively. The torque carried on intermediate shaft 16 is transferred to the output shaft 14 by engagement of the synchronizer 96.

The torque carrier on the intermediate shaft 18 is transferred via the gear set 60 by engagement of synchronizer 97 to the countershaft 20 and then through gear set 80 to output shaft 14.

To establish the next subsequent torque ratio, indicated as Gear 7 in the truth table of FIG. 2, input clutch 90 is engaged and synchronizer 97 is engaged. Thus, to shift from Gear 6 to Gear 7, input clutch 91 is released while input clutch 90 is engaged with synchronizer 97 remaining engaged. Torque is transferred from the input shaft 12 through input clutch 90 and ring gear member 34 to the intermediate shaft 18. Torque is then transferred through gear set 60 due to engagement of synchronizer 97 along countershaft 20 through gear set 80 to output shaft 14.

In addition to the nine forward torque ratios indicated in the truth table of FIG. 2, two additional forward torque ratios are achievable for a total of eleven forward torque ratios. One additional forward torque ratio is numerically achieved between Gear 1' and Gear 2 by combining engagement of the synchronizers indicated in Gear 1 and Gear 5 in the truth table of FIG. 2, along with input clutch 91. Thus, an optional torque ratio, which may be referred to as Gear 1" with a numerical value between that of Gear 1' and Gear 2' is achieved by engagement of input clutch 91 and synchronizers 93 and 96. Another optional torque ratio not shown in the truth table of FIG. 2 occurs numerically between Gear 4' and Gear 5 and may be referred to as Gear 4". Gear 4" is achieved by a combination of engagement of the synchronizers indicated in the forward Gears 2 and 7 in the truth table of FIG. 2, along with input clutch 91. Thus, Gear 4" occurs by engagement of input clutch 91 and synchronizers 94 and 97.

Figures 3, 4:
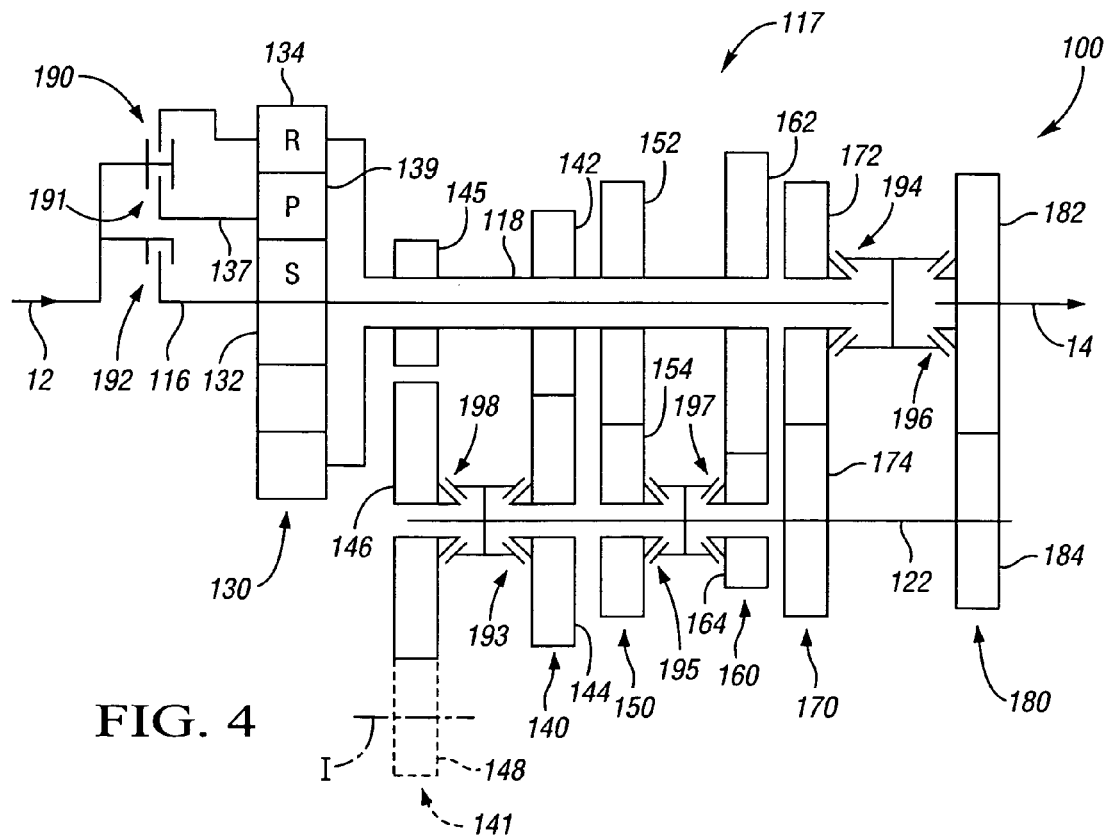
FIG. 3 is a listing of torque ratios and step ratios achieved by the transmission of FIG. 1 corresponding with the truth table of FIG. 2.
FIG. 4 is a schematic representation of a second embodiment of a transmission in accordance with the invention.

Referring to FIG. 3, torque ratios (i.e., the ratio of torque of the output member 14 to the input member 12) corresponding with each of the Gears shown in the truth table of FIG. 2 are listed. These torque ratios are achieved utilizing the following sample component torque ratios which, in turn, are dependent on tooth counts of the gears of the transmission 10: the ring gear member/sun gear member differential gear set torque ratio is 1.86; the torque ratio of gear 44 to gear 42 is 2.60; the torque ratio of gear 46 to gear 42 (transferred through idler gear 48) is 2.25; the torque ratio of gear 50 to gear 52 is 0.84; the torque ratio of gear 66 to gear 62 is 0.41; the torque ratio of gear 72 to gear 74 is 1.57; the torque ratio of gear 82 to either gear 84 or gear 86 is 1.57. The ratio steps between subsequent torque ratios are indicated in FIG. 3, with an overall torque ratio of 6.40. It is apparent from the truth table of FIG. 2 and the ratio chart of FIG. 3 that torque ratios that are achieved utilizing the input clutch 91 (i.e., with input clutch 91 in an engaged state) have a numerical value between subsequent on-coming and off-going torque ratios. Thus, by utilizing the input clutch 91 and the differential gear set 30, additional torque ratios are achieved than would be achievable with only the input clutches 90 and 92, as the latter result in torque ratios dependant only on the ratios of the countershaft gear sets and not of the differential gear set 30. The step from Gear 1 to Gear 2 is 1.65 while the step from Gear 1' to Gear 2 is 1.43 (indicated in brackets). The step from Gear 4 to Gear 5 is 1.31 while the step from Gear 4' to Gear 5 is 1.20 (indicated in brackets).

Second Embodiment

Referring to FIG. 4 a multi-speed transmission 100 is depicted. The transmission 100 includes an input member 12 and an output member 14. In this embodiment, the input member 12 and the output member 14 are shafts, and will be referred to as such. Those skilled in the art will appreciate that the input and output members 12, 14 may be components other than shafts. The input shaft 12 is continuously connected with an engine (not shown). The output shaft 14 is continuously connected with the final drive unit (not shown). The transmission 100 includes a countershaft gearing arrangement 117 that includes intermediate shafts, a countershaft, co-planar intermeshing gear sets and selectively engagable synchronizers as will be described herein. For instance, the countershaft gearing arrangement 117 includes an intermediate shaft 116 and an intermediate shaft 118, which is a sleeve shaft concentric with the intermediate shaft 116. The intermediate shafts 118 and 116 are referred to in the claims as the first and second intermediate shafts, respectively. The countershaft gearing arrangement 117 further includes a countershaft 122. Countershaft 122 is referred to in the claims as the first countershaft. The countershaft 122 is both spaced from and parallel with the input shaft 12, the output shaft 14 and the intermediate shafts 116, 118.

A differential gear set 130, which is a simple planetary gear set, is connected between the input shaft 12 and the output shaft 14. The differential gear set 130 includes sun gear member 132 (labeled S) connected for common rotation with the intermediate shaft 116, a ring gear member 134 (labeled R) connected for common rotation with the intermediate shaft 118, and a carrier member 137 which rotatably supports a set of pinion gears 139 (labeled P) which intermesh with both the sun gear member 132 and the ring gear member 134.

The countershaft gearing arrangement 117 also includes co-planar, intermeshing gear sets 140, 141, 150, 160, 170 and 180. Gear set 140 includes gears 142 and 144. Gear 142 is connected for common rotation with the intermediate shaft 118 and intermeshes with gear 144, which is rotatable about and selectively connectable with the countershaft 122. Gear set 141 includes gear 145, gear 146 and idler gear 148. Gear 146 is rotatable about and selectively connectable with the countershaft 122. Idler gear 148 rotates about idler axis I and intermeshes with both the gear 145 and gear 146. (Gear 148 is shown intermeshing only with gear 146 but those skilled in the art will readily understand that gear 148 is actually placed adjacent and between gears 145 and 146 to allow torque transfer therebetween).

Co-planar gear set 150 includes gear 152 and gear 154. Gear 152 is connected for common rotation with intermediate shaft 118 and intermeshes with gear 154, which rotates about and is selectively connectable with countershaft 122.

Gear set 160 includes co-planar intermeshing gears 162 and 164. Gear 162 is connected for common rotation with the intermediate shaft 118 and intermeshes with gear 164, which is rotatable about and selectively connectable with countershaft 122.

Gear set 170 includes co-planar, intermeshing gears 172 and 174. Gear 172 rotates about and is selectively connectable with intermediate shaft 116. Gear 172 intermeshes with gear 174, which is connected for common rotation with countershaft 122.

Gear set 180 includes gear 182 and gear 184. Gear 182 is connected for common rotation with the output shaft 14 and is selectively connectable with the intermediate shaft 116. Gear 182 intermeshes with gear 184. Gear 184 is connected for common rotation with the countershaft 122.

The transmission 100 includes a variety of torque-transmitting mechanisms or devices including input clutch 190, input clutch 191, and input clutch 192. In the claims, input clutch 190 is referred to as the first torque-transmitting mechanism, input clutch 192 is referred to as the second torque-transmitting mechanism and input clutch 191 is referred to as the third torque-transmitting mechanism. Input clutch 190 is selectively engagable to connect the input shaft 12 with the ring gear member 134. Input clutch 191 is selectively engagable to connect the input shaft 12 with the carrier member 137. Input clutch 192 is selectively engagable to connect the input shaft 12 with the sun gear member 132 and the intermediate shaft 116. The transmission 100 further includes a plurality of selectively engagable synchronizers 193, 194, 195, 196, 197, and 198. Synchronizer 193 is selectively engagable to connect gear 144 with countershaft 122 for common rotation therewith. Synchronizer 193 if referred to in the claims as the first synchronizer. Synchronizer 194 is selectively engagable to connect gear 172 with intermediate shaft 116 for common rotation therewith. Synchronizer 194 is referred to in the claims as the second synchronizer. Synchronizer 195 is selectively engagable to connect gear 154 with countershaft 122 for common rotation therewith. Synchronizer 196 is selectively engagable to connect the gear 182, and therefore the output shaft 14, with the intermediate shaft 116 for common rotation therewith. Synchronizer 197 is selectively engagable to connect gear 164 with countershaft 122 for common rotation therewith. Synchronizer 198 is selectively engagable to connect gear 146 with countershaft 122 for common rotation therewith.

The transmission 100 is capable of transmitting torque from the input shaft 12 to the output shaft 14 at the nine forward torque ratios and one reverse torque ratio indicated in FIG. 2. The two additional forward torque ratios and the two extra reverse torque ratios described above with respect to transmission 10 of FIG. 1 may be achieved for a total of eleven forward torque ratios and three reverse torque ratios. Those skilled in the art will readily understand how these torque ratios are achieved, based on the description of the transmission 10.

Third Embodiment

Figures 5, 6:
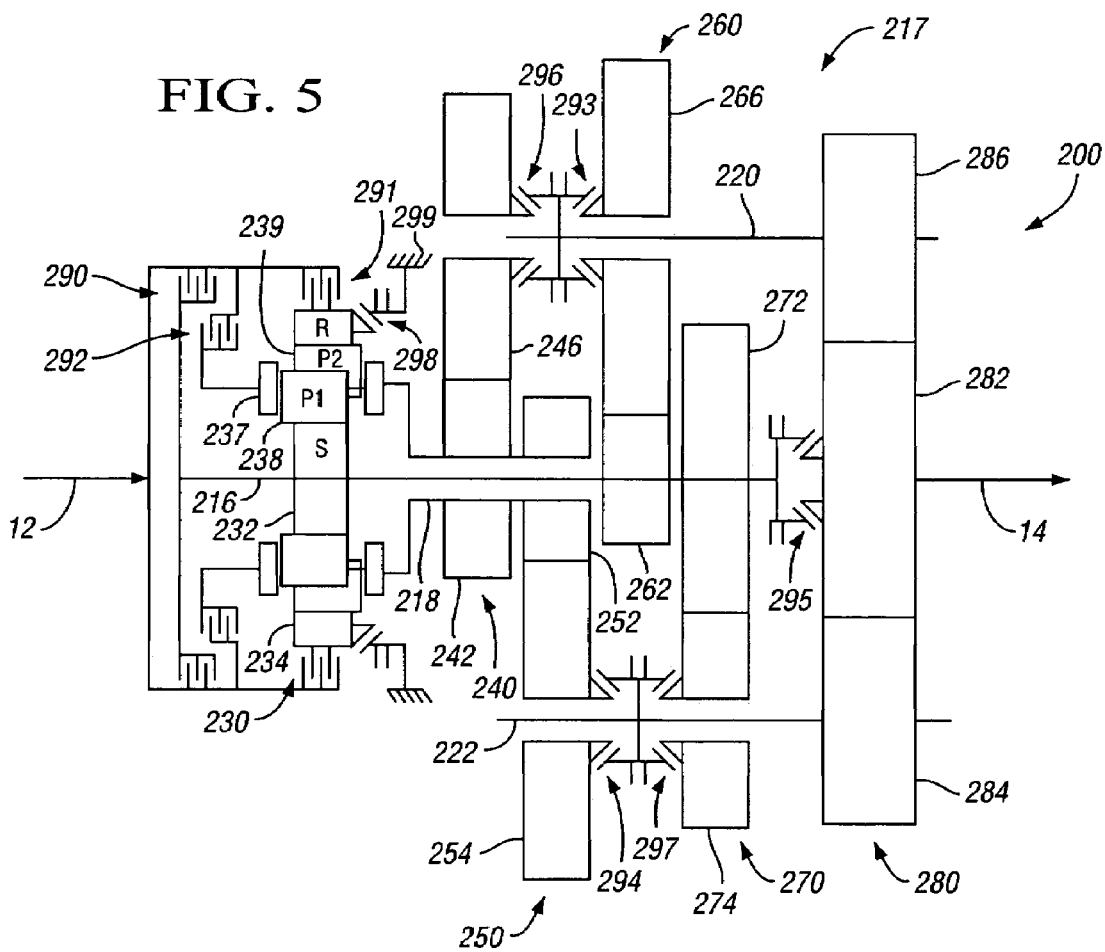
FIG. 5 is a schematic representation of a third embodiment of a transmission in accordance with the invention.
FIG. 6 is a truth table listing the engaged torque-transmitting mechanisms and synchronizers for selected torque ratios of the transmission of FIG. 5.

Referring to FIG. 5 a multi-speed transmission 200 is depicted. The transmission 200 includes an input member 12 and output member 14. In this embodiment, the input member 12 and the output member 14 are shafts, and will be referred to as such. Those skilled in the art will appreciate that the input and output members 12, 14 may be components other than shafts. The input shaft 12 is continuously connected with an engine (not shown). The output shaft 14 is continuously connected with the final drive unit (not shown). The transmission 200 includes a countershaft gearing arrangement 217 that includes intermediate shafts, countershafts, co-planar intermeshing gear sets and selectively engagable synchronizers as will be described herein. For instance, the countershaft gearing arrangement 217 includes an intermediate shaft 216 and an intermediate shaft 218, which is a sleeve shaft concentric with the intermediate shaft 216. The intermediate shafts 218 and 216 are referred to in the claims as the first and second intermediate shafts, respectively. The countershaft gearing arrangement 217 further includes a countershaft 220 and a countershaft 222. Countershaft 222 is referred to in the claims as the second countershaft and countershaft 220 is referred to in the claims as the first countershaft. The countershafts 220, 222 are both spaced from and parallel with the input shaft 12, the output shaft 14 and the intermediate shafts 216, 218.

A differential gear set 230, which is a double-pinion planetary gear set, is connected between the input shaft 12 and the output shaft 14. The differential gear set 230 includes sun gear member 232 (labeled S) connected for common rotation with the intermediate shaft 216, a ring gear member 234 (labeled R), and a carrier member 237 connected for common rotation with the intermediate shaft 218 and which rotatably supports two sets of pinion gears 238, 239 (labeled P1 and P2, respectively). Pinion gears 238 intermesh with the sun gear member 232 and with the pinion gears 239. Pinion gears 239 intermesh with the ring gear member 234.

The countershaft gearing arrangement 217 also includes co-planar, intermeshing gear sets 240, 250, 260, 270 and 280. Gear set 240 includes gears 242 and 246. Gear 242 is connected for common rotation with the intermediate shaft 218 and intermeshes with gear 246, which is rotatable about and selectively connectable with the countershaft 220.

Co-planar gear set 250 includes gear 252 and gear 254. Gear 252 is connected for common rotation with intermediate shaft 218 and intermeshes with gear 254, which rotates about and is selectively connectable with countershaft 222.

Gear set 260 includes co-planar intermeshing gears 262 and 266. Gear 262 is connected for common rotation with the intermediate shaft 216 and intermeshes with gear 266, which is rotatable about and selectively connectable with countershaft 220.

Gear set 270 includes co-planar, intermeshing gears 272 and 274. Gear 272 is connected for common rotation with intermediate shaft 216. Gear 272 intermeshes with gear 274, which rotates about and is selectively connectable with countershaft 222.

Gear set 280 includes gear 282, gear 284 and gear 286. Gear 282 is connected for common rotation with the output shaft 14 and is selectively connectable with the intermediate shaft 216. Gear 282 intermeshes with both gear 284 and gear 286. Gear 284 is connected for common rotation with the countershaft 222. Gear 286 is connected for common rotation with the countershaft 220.

The transmission 200 includes a variety of torque-transmitting mechanisms or devices including input clutch 290, input clutch 291, and input clutch 292. In the claims, input clutch 290 is referred to as the first torque-transmitting mechanism, input clutch 292 is referred to as the second torque-transmitting mechanism and input clutch 291 is referred to as the third torque-transmitting mechanism. Input clutch 290 is selectively engagable to connect the input shaft 12 with the sun gear member 232. Input clutch 291 is selectively engagable to connect the input shaft 12 with the ring gear member 234. Input clutch 292 is selectively engagable to connect the input shaft 12 with the carrier member 237. The transmission 200 further includes a plurality of selectively engagable synchronizers 293, 294, 295, 296, 297, and 298. Synchronizer 293 is selectively engagable to connect gear 266 with countershaft 220 for common rotation therewith. Synchronizer 293 is referred to in the claims as the first synchronizer. Synchronizer 294 is selectively engagable to connect gear 254 with countershaft 222 for common rotation therewith. Synchronizer 294 is referred to in the claims as the second synchronizer. Synchronizer 295 is selectively engagable to connect gear 282, and therefore the output shaft 14, with intermediate shaft 216 for common rotation therewith. Synchronizer 296 is selectively engagable to connect the gear 246 with the countershaft 220 for common rotation therewith. Synchronizer 297 is selectively engagable to connect gear 274 with countershaft 220 for common rotation therewith. Synchronizer 298 is selectively engagable to ground the ring gear member 234 with stationary transmission housing 299. Synchronizer 298 is referred to in the claims as the additional synchronizer.

The transmission 200 is capable of transmitting torque from the input shaft 12 to the output shaft 14 in at least seven forward torque ratios and one reverse torque ratio, as indicated in the truth table of FIG. 6. Up to four additional forward torque ratios (two of which are indicated in FIG. 6) may be achieved for a total of eleven forward torque ratios. The other two additional forward torque ratios are achieved in the same manner as ratios referred to as 1" and 4" in the description of the transmission 10 of FIG. 1 (i.e., ratio 1" is achieved by combining the engaged synchronizers of Gears 1 and 5 along with input clutch 291, and ratio 4" is achieved by combining the engaged synchronizers of Gears 2 and 7, along with input clutch 291). Those skilled in the art will readily understand how the torque ratios of FIG. 6 are achieved based on the description of transmission 10.

With respect to the reverse torque ratio REV, this ratio is achieved by engaging input clutch 292, and synchronizers 293 and 298. Because the ring gear member 234 is grounded by engaging synchronizer 298, the torque provided to the carrier member 237 via application of input clutch 292 is delivered through pinion gears 238 and 239 such that intermediate shaft 216 rotates in an opposite direction as input shaft 12. The torque fed through gear set 260 via engagement of synchronizer 293 is then delivered from countershaft 220 through gear set 280 to output shaft 14 such that output shaft 14 rotates in a direction opposite that of input shaft 12. Utilizing synchronizer 298 in combination with the double-pinion planetary gear set 230 to provide the reverse torque ratio REV allows a separate, dedicated plane of reversing gears to be eliminated.

Figures 7, 8:
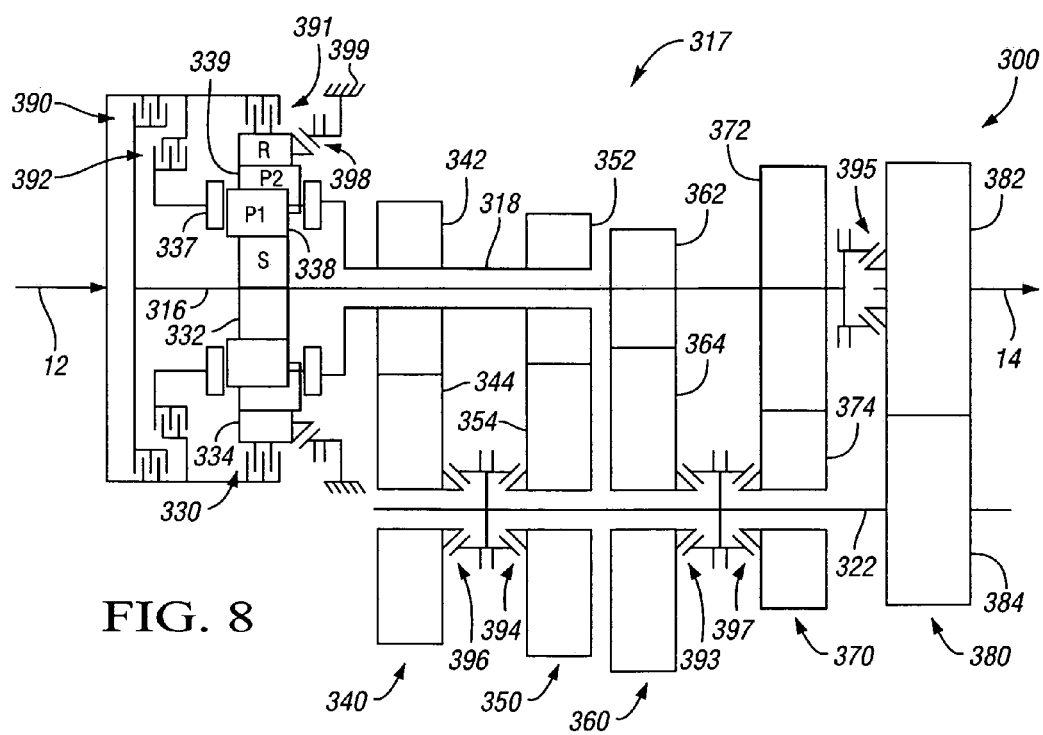
FIG. 7 is a ratio chart listing the torque ratios and ratio steps achieved by the transmission of FIG. 5 corresponding with the truth table of FIG. 6.
FIG. 8 is a schematic representation of a fourth embodiment of a transmission in accordance with the invention.

Referring to FIG. 7, the torque ratios and ratio steps for each of the nine forward torque ratios and the reverse torque ratio indicated in FIG. 6 are shown. The step from Gear 1 to Gear 2 is 1.51 while the step from Gear 1' to Gear 2 is 1.27 (shown in brackets). The step from Gear 4 to Gear 5 is 1.38 while the step from Gear 4' to Gear 5 is 1.20 (shown in brackets). Optionally, up to four additional reverse ratios may be achieved by engagement of input clutch 292 and synchronizer 298 along with one of the other four synchronizers 294, 295, 296 and 297, respectively.

Fourth Embodiment

Referring to FIG. 8, a multi-speed transmission 300 is depicted. The transmission 300 includes an input member 12 and output member 14. In this embodiment, the input member 12 and the output member 14 are shafts, and will be referred to as such. Those skilled in the art will appreciate that the input and output members 12, 14 may be components other than shafts. The input shaft 12 is continuously connected with an engine (not shown). The output shaft 14 is continuously connected with the final drive unit (not shown). The transmission 300 includes a countershaft gearing arrangement 317 that includes intermediate shafts, a countershaft, co-planar intermeshing gear sets and selectively engagable synchronizers as will be described herein. For instance, the countershaft gearing arrangement 317 includes an intermediate shaft 316 and an intermediate shaft 318, which is a sleeve shaft concentric with the intermediate shaft 316. The intermediate shafts 318 and 316 are referred to in the claims as the first and second intermediate shafts, respectively. The countershaft gearing arrangement 317 further includes a countershaft 322. Countershaft 322 is referred to in the claims as the first countershaft. The countershaft 322 is spaced from and parallel with the input shaft 12, the output shaft 14 and the intermediate shafts 316, 318.

A differential gear set 330, which is a double-pinion planetary gear set, is connected between the input shaft 12 and the output shaft 14. The differential gear set 330 includes sun gear member 332 (labeled S) connected for common rotation with the intermediate shaft 316, a ring gear member 334 (labeled R) and a carrier member 337 connected for common rotation with the intermediate shaft 18, and which rotatably supports two sets of pinion gears 338, 339 (labeled P1 and P2, respectively). Pinion gears 338 intermesh with the sun gear member 332 and with pinion gears 339. Pinion gears 339 intermesh with the ring gear member 334.

The countershaft gearing arrangement 317 also includes co-planar, intermeshing gear sets 340, 350, 360, 370 and 380. Gear set 340 includes gears 342 and 344. Gear 342 is connected for common rotation with the intermediate shaft 318 and intermeshes with gear 344, which is rotatable about and selectively connectable with the countershaft 322.

Co-planar gear set 350 includes gear 352 and gear 354. Gear 352 is connected for common rotation with intermediate shaft 318 and intermeshes with gear 354, which rotates about and is selectively connectable with countershaft 322.

Gear set 360 includes co-planar intermeshing gears 362 and 364. Gear 362 is connected for common rotation with the intermediate shaft 316 and intermeshes with gear 364, which is rotatable about and selectively connectable with countershaft 322.

Gear set 370 includes co-planar, intermeshing gears 372 and 374. Gear 372 rotates about and is selectively connectable with intermediate shaft 316. Gear 372 intermeshes with gear 374, which is selectively connectable with countershaft 322.

Gear set 380 includes gear 382 and gear 384. Gear 382 is connected for common rotation with the output shaft 14 and is selectively connectable with the intermediate shaft 316. Gear 382 intermeshes with gear 384. Gear 384 is connected for common rotation with the countershaft 322.

The transmission 300 includes a variety of torque-transmitting mechanisms or devices including input clutch 390, input clutch 391, and input clutch 392. In the claims, input clutch 390 is referred to as the first torque-transmitting mechanism, input clutch 392 is referred to as the second torque-transmitting mechanism and input clutch 391 is referred to as the third torque-transmitting mechanism. Input clutch 390 is selectively engagable to connect the input shaft 12 with the sun gear member 332. Input clutch 391 is selectively engagable to connect the input shaft 12 with the ring gear member 334. Input clutch 392 is selectively engagable to connect the input shaft 12 with the sun gear member 332. The transmission 300 further includes a plurality of selectively engagable synchronizers 393, 394, 395, 396, 397, and 398. Synchronizer 393 is selectively engagable to connect gear 364 with countershaft 322 for common rotation therewith. Synchronizer 393 is referred to in the claims as the first synchronizer. Synchronizer 394 is selectively engagable to connect gear 354 with countershaft 322 for common rotation therewith. Synchronizer 395 is selectively engagable to connect gear 382, and therefore output shaft 14, with intermediate shaft 316 for common rotation therewith. Synchronizer 396 is selectively engagable to connect the gear 344 with the countershaft 322 for common rotation therewith. Synchronizer 397 is selectively engagable to connect gear 374 with countershaft 322 for common rotation therewith. Synchronizer 398 is selectively engagable to ground the ring gear member 334 to the stationary transmission housing 399. Synchronizer 398 is referred to in the claims as the additional synchronizer. Synchronizer 398 is engaged along with input clutch 392 and synchronizer 393 to provide a reverse torque ratio described with respect to correspondingly numbered components of the transmission 200 of FIG. 5.

The transmission 300 is capable of transmitting torque from the input shaft 12 to the output shaft 14 in at least seven forward torque ratios and one reverse torque ratio with an engagement schedule as indicated in the truth table of FIG. 6 with respect to correspondingly-numbered components of the transmission 200 of FIG. 5. Up to four additional forward torque ratios (two of which are indicated in FIG. 6) may be achieved for a total of eleven forward torque ratios.

While the best modes for carrying out the invention have been described in detail, those familiar with the art to which this invention relates will recognize various alternative designs and embodiments for practicing the invention within the scope of the appended claims.

The invention claimed is:

1. A transmission comprising:
   an input member;
   an output member;
   a differential gear set having first, second and third members;
   a first, a second and a third torque-transmitting mechanism each selectively engageable to connect said input member with a respective different one of said members of said differential gear set;
   a countershaft gearing arrangement operatively connected with said differential gear set and including sets of co-planar intermeshing gears, a plurality of shafts, and a plurality of synchronizers selectively engagable to connect selected ones of said gears with selected ones of said shafts for common rotation to thereby transfer torque from said differential gear set to said output member along said plurality of shafts and said sets of co-planar intermeshing gears; and
   wherein first, second and third different torque ratios of said output member to said input member are established when said first torque-transmitting mechanism and a first of said synchronizers, said second torque-transmitting mechanism and a second of said synchronizers, and said third torque-transmitting mechanism and both said first and second synchronizers are engaged, respectively.

2. The transmission of claim 1, wherein said first and second torque ratios are determined based on torque ratios of said co-planar, intermeshing gears and not by a torque ratio of said differential gear set; and wherein said third torque ratio is determined based on said torque ratios of said co-planar, intermeshing gears and of said differential gear set.

3. The transmission of claim 2, wherein said third torque ratio is less than said first torque ratio and greater than said second torque ratio.

4. The transmission of claim 1, wherein said plurality of shafts includes:
   a first intermediate shaft connected for common rotation with said first member of said differential gear set;
   a second intermediate shaft connected for common rotation with said second member of said differential gear set;
   a first countershaft radially offset from said intermediate shafts;
   wherein some of said sets of co-planar, intermeshing gears each include a gear rotatable about said first countershaft and a gear connected for common rotation with said first intermediate shaft; and
   wherein some of said synchronizers are each selectively engagable to connect a respective one of said gears rotatable about said first countershaft with said first countershaft for common rotation.

5. The transmission of claim 4, further comprising:
   a second countershaft radially offset from said intermediate shafts and from said first countershaft;
   wherein other of said sets of co-planar, intermeshing gears each include a gear rotatable about said second countershaft and a gear connected for common rotation with said first intermediate shaft; and
   wherein other of said synchronizers are each selectively engagable to connect a respective one of said gears rotatable about said second countershaft with said second countershaft for common rotation.

6. The transmission of claim 1, wherein said differential gear set is a planetary gear set; and wherein said first member is a ring gear member, said second member is a carrier member rotatably supporting a set of pinion gears, and said third member is a sun gear member; wherein said first torque-transmitting mechanism selectively connects said input member with said ring gear member, said second torque-transmitting mechanism selectively connects said input member with said sun gear member and said third torque-transmitting mechanism selectively connects said input member with said carrier member.

7. The transmission of claim 1, wherein said differential gear set is a double-pinion planetary gear set; wherein said first gear member is a sun gear member, said second gear member is a carrier member rotatably supporting two sets of pinion gears, and said third gear member is a ring gear member; wherein said first torque-transmitting mechanism selectively connects said input member with said sun gear member, said second torque-transmitting mechanism selectively connects said input member with said carrier member, and said third torque-transmitting mechanism selectively connects said input member with said ring gear member.

8. The transmission of claim 7, further comprising:
   an additional synchronizer selectively grounding said ring gear member with a stationary member; wherein said second torque-transmitting mechanism, said additional synchronizer and said first synchronizer are selectively engaged to establish a reverse torque ratio between said output member and said input member.

9. A transmission comprising:
   an input member;
   an output member;
   a planetary gear set having a ring gear member, a sun gear member and a carrier member rotatably supporting a set of pinion gears;
   a first torque-transmitting mechanism selectively engagable to connect said input member with said ring gear member, a second torque-transmitting mechanism selectively engagable to connect said input member with said sun gear member, and a third torque-transmitting mechanism selectively engagable to connect said input member with said carrier member;
   a countershaft gearing arrangement operatively connected with said planetary gear set and including sets of co-planar intermeshing gears, a plurality of shafts, and a plurality of synchronizers selectively engagable to connect selected ones of said gears with selected ones of said shafts for common rotation to thereby transfer torque from said planetary gear set to said output member;

wherein first, second and third different torque ratios of said output member to said input member are established when said first torque-transmitting mechanism and a first of said synchronizers, said second torque-transmitting mechanism and a second of said synchronizers, and said third torque-transmitting mechanism and both said first and second synchronizers are engaged, respectively;

wherein said first and second torque ratios are determined based on torque ratios of said co-planar, intermeshing gears and not by a torque ratio of said planetary gear set; and wherein said third torque ratio is determined based on said torque ratios of said co-planar, intermeshing gears and of said planetary gear set.

10. The transmission of claim 9, wherein said plurality of shafts includes a first intermediate shaft, a second intermediate shaft concentric with said first intermediate shaft and a first countershaft; and wherein said sets of co-planar, intermeshing gears have thirteen gears arranged in six planes to provide at least seven forward torque ratios and a reverse torque ratio.

11. The transmission of claim 9, wherein said plurality of shafts includes a first intermediate shaft, a second intermediate shaft concentric with said first intermediate shaft, a first countershaft and a second countershaft; and wherein said sets of co-planar, intermeshing gears have thirteen gears arranged in five planes to provide at least seven forward torque ratios and a reverse torque ratio.

12. A transmission comprising:
an input member;
an output member;
a planetary gear set having a ring gear member, a sun gear member and a carrier member rotatably supporting two sets of pinion gears;
a first torque-transmitting mechanism selectively engagable to connect said input member with said sun gear member, a second torque-transmitting mechanism selectively engagable to connect said input member with said carrier member, and a third torque-transmitting mechanism selectively engagable to connect said input member with said ring gear member;
a countershaft gearing arrangement operatively connected with said planetary gear set and including sets of co-planar intermeshing gears, a plurality of shafts, and a plurality of synchronizers selectively engagable to connect selected ones of said gears with selected ones of said shafts for common rotation to thereby transfer torque from said planetary gear set to said output member;

wherein first, second and third different torque ratios of said output member to said input member are established when said first torque-transmitting mechanism and a first of said synchronizers, said second torque-transmitting mechanism and a second of said synchronizers, and said third torque-transmitting mechanism and both said first and second synchronizers are engaged, respectively;

wherein said first and second torque ratios are determined based on torque ratios of said co-planar, intermeshing gears and not by a torque ratio of said planetary gear set; and wherein said third torque ratio is determined based on said torque ratios of said co-planar, intermeshing gears and of said planetary gear set.

13. The transmission of claim 12, wherein said plurality of shafts includes a first intermediate shaft, a second intermediate shaft concentric with said first intermediate shaft and a first countershaft; and wherein said sets of co-planar, intermeshing gears have ten gears arranged in five planes to provide at least seven forward torque ratios.

14. The transmission of claim 12, wherein said plurality of shafts includes a first intermediate shaft, a second intermediate shaft concentric with said first intermediate shaft, a first countershaft and a second countershaft; and wherein said sets of co-planar, intermeshing gears have eleven gears arranged in five planes to provide at least seven forward torque ratios.

15. The transmission of claim 12, further comprising:
an additional synchronizer selectively grounding said ring gear member with a stationary member; wherein said second torque-transmitting mechanism, said additional synchronizer and said first synchronizer are selectively engaged to establish a reverse torque ratio between said output member and said input member.

* * * * *